United States Patent Office 3,451,862
Patented June 24, 1969

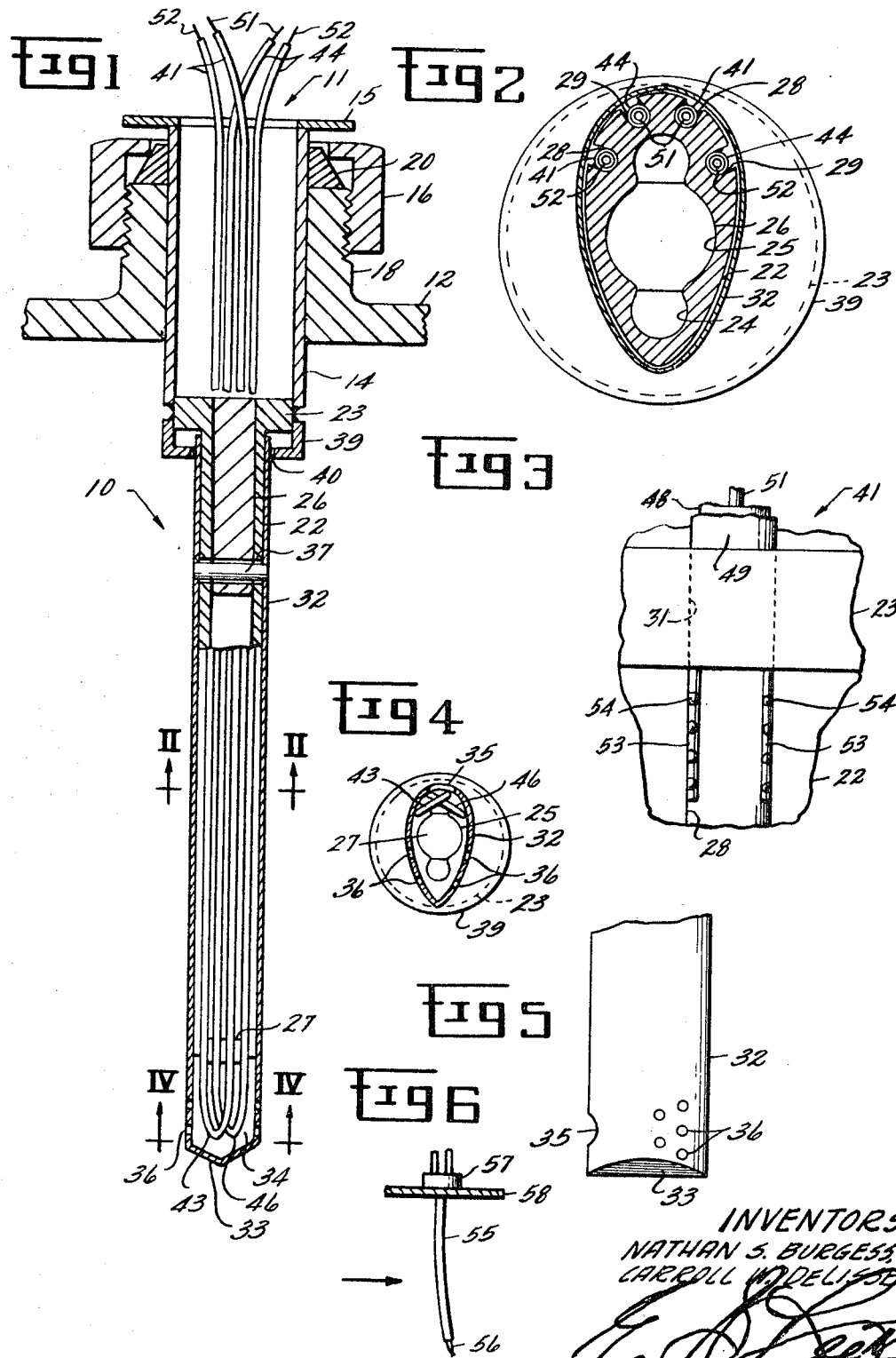

3,451,862
TEMPERATURE SENSOR PROBE
Nathan S. Burgess, Jr., Westchester, and Carroll W. de Lisse, Deer Park, Ohio, assignors, by mesne assignments, to the United States of America
Filed Sept. 6, 1966, Ser. No. 577,330
Int. Cl. H01v 1/02
U.S. Cl. 136—231
9 Claims

ABSTRACT OF THE DISCLOSURE

A temperature sensing probe is disclosed which comprises a hollow relatively stiff structural core and a loose fitting thin-walled shroud covering the core. Core design is disclosed wherein the leading edge of the core has a thickness which is large relative to that of the remainder of the probe, thereby promoting even temperature distribution throughout the core and minimizing distortion thereof. Means for securing sheathed thermocouple leads to the core are also disclosed.

---

The present invention relates to a temperature sensing probe and more particularly to a temperature sensing probe for insertion in a hot gas stream.

When it is desired to sense the temperature of a hot gas stream with a temperature sensing element it is necessary to provide a mounting structure to maintain the temperature sensing element in a fixed position in the gas stream. Usually mounting structures for this purpose take the form of an elongated member which extends into the gas stream from a support of a gas stream confining wall. The temperature sensing elements are usually secured to the mounting structure in such a fashion that movement relative to the structure is prevented and the temperature sensing element protected from adverse effects of the hot gas stream.

One of the problems that arises when such an arrangement is used in that the temperature sensor radiates heat to the confining wall which is at a much lower temperature. As a result, the indicated temperature is substantially lower than the true gas temperature.

Another problem results from stresses imposed on the mounting member which cause it to deflect in the direction of gas flow. One of the stresses imposed is an aerodynamic stress resulting from the gases impinging on the upstream edge of the mounting member.

Another, and much more significant stress, is caused by rapid temperature and flow rate changes of the hot gas stream. The flow of gas creates a temperature gradient from the upstream to the downstream edge of the elongated member. As a result, the upstream portion of the member has a greater thermal expansion than the downstream portion which tends to deflect the member in the direction of gas flow.

Deflection of the member may impair the accuracy of the temperature sensor and in extreme situations destroy its functioning altogether.

Accordingly, it is an object of the present invention to provide an extremely rigid, secure and effective mounting for a temperature sensor.

The above ends are achieved in one aspect by providing a probe for insertion in a hot gas stream which comprises a hollow elongated, relatively stiff, structural core having a free end extending into the gas stream. A loose fitting thin-walled shroud extends at least substantially to the free end of the core, thereby forming a clearance therebetween in which stagnant gas is disposed to form a thermal barrier between the shroud and the core for minimizing the heat transferred to the core and substantially reducing the temperature gradient therein. The deflection of the probe due to thermal expansion is therefore greatly minimized.

Preferably, the probe is used in combination with a temperature sensing element having leads extending lengthwise of the structural core and beyond the free end thereof. The end of the shroud extends beyond the free end of the structural core, thereby forming a temperature sensing chamber therewith. The shroud has openings therein to form an inlet and an outlet for the sensing chamber, whereby the temperature sensing element senses the temperature of the hot gas stream with a high degree of accuracy.

In yet another aspect the invention comprises a temperature sensing probe for insertion in a hot gas stream, the probe comprising a structural member extending into the gas stream. The member has a groove therein in which a temperature sensing element having an outer sheath is disposed. A pair of wires having relatively high resistance is longitudinally disposed in the groove against the shealth and the walls of the groove. The wires are forcibly localized-resistance welded to the sheath at the point of contact therebetween and to the walls of the groove at a plurality of locations along the length of the wires.

The above and other related objects and features of the present invention will be apparent from a reading of the following description of the disclosure found in the accompanying drawing and the novelty thereof pointed out in the appended claims.

In the drawings:

FIGURE 1 is a longitudinal section view of a temperature sensor probe embodying the present invention;

FIGURE 2 is a view taken on line II—II of FIGURE 1;

FIGURE 3 is an enlarged, fragmentary view of the temperature sensor probe of FIGURE 1;

FIGURE 4 is a view taken on line IV—IV of FIGURE 1;

FIGURE 5 is a fragmentary exterior view of the probe of FIGURE 1; and

FIGURE 6 is a view of a prior art temperature sensor probe showing the results of thermal stresses imposed thereon.

Reference is had to FIGURE 1 which shows a thermocouple probe 10 used to sense the temperature of a hot gas stream flowing within a confining wall 12.

The probe 10 comprises a cylindrical base 14 extending through a boss 18 in the confining wall 12. The base 14 is secured in place by a nut 16 which is threaded onto the boss 18 and acts against a flange 20 on the base 14. A flange 15 is secured to the end of cylinder 14 to loosely retain the nut 16 when the probe is detached from the wall 12.

A hollow streamlined structural core 22 is secured to the base 14 by welding a flange 23 thereto. The structural core 22 has a longitudinal chamber formed by overlapping holes 24, 25 as shown in FIGURE 2. The opposite ends of this chamber are plugged by flatted pins 26, 27, which are preferably welded in place. The pins 26 are elongated to aid in the transfer of heat from the probe 10 to the wall 12.

A series of longitudinal grooves 28, 29 (FIGURES 1 and 2) are formed in the leading edge of the structural core 22. A series of corresponding holes 31 (FIGURE 3) in the flange 23 provide a straight path from the grooves 28, 29 into the interior of the base 14.

A tubular shroud 32 having a streamlined cross section is telescoped over the structural core 22 and extends beyond its end. The shroud 32 fits loosely over the structural core to form an effective thermal barrier therebetween, even though there may be some points of conact. The lower end of the shroud 32 is closed to form a chamber 34 in combination with the end of core 22 and the interior walls of the shroud 32. An opening 35 is provided in the upstream end of the shroud 32 to form an inlet for chamber 34, and a series of holes 36 are provided in the side walls of the shroud 32 to form outlets, as shown in FIGURE 5.

The shroud 32 is loosely held over the core 22 by means of a tubular pin 37 passing through the walls of the shroud 32, and a hole 38 in the core 22. A cap 39, secured to the flange 23, has an opening 40 corresponding to the outline of the shroud 32 to form a guide therefor. The tubular pin 37 may be easily drilled out of the hole 38 to facilitate replacement of the shroud 32 if its function has been deteriorated by the effects of the hot gas stream.

The temperature sensing means of the present probe preferably comprise thermocouple elements 41, 44. Each element is formed by an outer sheath 49 and coaxial wires 51, 52 of different material which are formed at a thermocouple juncture. The wires 51, 52 are insulated from the sheath 49 by a suitable material such as a ceramic layer 48, as shown in FIGURE 3.

The thermocouple elements 41, 44 are respectively passed through the holes 31 and secured in the grooves 28, 29. The thermocouple lead 41 is secured in the grooves 28, 29 by means of filler wires 53 which lie in the grooves 28 over the thermocouple sheath 49, as shown in FIGURE 3. The filler wires which may be Nichrome or other suitable high resistance wire are localized-resistance welded with a cone-shaped electrode probe to the thermocouple sheath 49 and to the core 22 at a plurality of locations 54 along their length. The thermocouple element 44 is secured in a similar fashion in groove 29.

The thermocouple elements 41, 44 are formed in closed loops or bends 43, 46 at the thermocouple junctures which are thus disposed in the chamber 34, as shown in FIGURE 4. The thermocouple elements are connected to an appropriate indicating or control system. Each element senses the same temperature and, of course, a single element could be employed.

In operation, the hot gas stream flows around the shroud 32 and through the chamber 34. The gases entering the inlet 35 impinge upon the junctures of the thermocouple leads 41, 44, thereby causing a voltage output from the probe proportional to the stagnation temperature of the gas stream. Radiation losses from the thermocouple elements 41, 44 are minimized by the walls of the chamber 34 which have a temperature approaching that of the hot gas stream. As a result the accuracy of the temperature sensed by the thermocouple elements is greatly enhanced.

As the hot gas stream flows around the exposed portion of the probe 10, aerodynamic and thermal stresses are generated which act to deflect the core 22 and shroud 32 in the direction of flow.

An example of the results of these stresses is shown in FIGURE 6 which shows a prior art temperature sensor probe 55 and temperature sensing element 56 of similar proportions which is mounted to a gas stream confining wall by means of a base 57. The aerodynamic forces act on the probe 55 to deflect it in the direction of flow. In addition, a temperature gradient is created across the probe 55 that causes a relatively large differential expansion. As a result the deflection of the probe 55 is substantial and may be enough to cause structural failure.

In the present invention, the aerodynamic stresses arising from the velocity of the gas impinging on the shroud are relatively small and minimized by the provision of a streamlined cross section for the shroud 32.

The thermal stresses in the shroud 32 are reduced somewhat by the fact that the gas stream urges it into contact with the upstream edge of the core 22, thus permitting a greater flow of heat from the upstream portion of the shroud 32 to the core 22.

The thermal stress in the structural core 22 is greatly reduced by the thermal barrier between the shroud 32 and core 22 which minimizes the flow of heat to the core 22 and hence its thermal growth. Although the shroud 32 may contact the core 22 along its leading edge, the type of contact is not so intimate as to destroy the effects of the thermal barrier. A somewhat greater amount of heat is transmitted to the upstream edge than to the downstream edge of the core 22, but the temperature gradient therebetween is minimized, if not eliminated, because the greater wall thickness of the upstream portion carries away the greater amount of heat.

It is apparent then, that the thermal growth of the core 22 is substantially equal across its cross section, thereby minimizing its deflection. As a result of the relatively small clearance space between the shroud 32 and the core 22, any deflection of the thin-walled shroud 32 is restrained by the relatively rigid structural core 22.

The securing of the thermocouple elements in the grooves 28, 29, in addition to protecting the elements from vibration, also minimize the thermal stresses therein. The weld points 54 provide a substantial flow path for heat from the thermocouple elements 28, 29 to the structural core 22, thus preventing temperature differential therebetween which can cause differential expansion.

The invention thus described provides a very rigid and durable probe which may be used to support a temperature sensing element in a hot gas stream.

It will be understood that the invention is not limited to the specific details of the construction and arrangement of the particular embodiment illustrated and described herein. It is, therefore, intended to cover in the appended claims all such changes and modifications which may occur to those skilled in the art without departing from the true spirit and scope of the invention.

What is claimed as novel and desired to be secured by Letters Patent of the United States is:

1. A probe for insertion in a hot gas stream, said probe comprising,
   a hollow, relatively stiff structural core having a free end for extending into said gas stream, said core having a greater wall thickness at its upstream portion than at its downstream portion,
   a loose fitting thin-walled shroud extending at least substantially to the free end of said core, thereby forming a clearance therebetween in which stagnant gas is trapped to form a thermal barrier between said shroud and said structural core for minimizing the heat transferred to said core and substantially reducing the temperature gradient therein,
   whereby the deflection of said probe due to thermal expansion is greatly minimized.

2. A probe as in claim 1 wherein,
   said shroud has a streamlined cross section for minimizing the aerodynamic force applied to said probe by said hot gas stream.

3. A probe as in claim 2 wherein,
   said shroud is detachably secured to said structural core, whereby said shroud may be replaced when said hot gas stream deteriorates the surface thereof.

4. A probe as in claim 2 in combination with,
   a temperature sensing element having leads extending lengthwise of said structural core and beyond the free end thereof,
   the end of said shroud extends beyond the free end of said structural core, thereby forming a temperature sensing chamber therewith,
   said shroud has openings therein to form an inlet and an outlet for said chamber, whereby the temperature sensing element senses the temperature of said hot gas stream with a high degree of accuracy.

5. Apparatus as in claim 4 wherein,
   said temperature sensing element is a thermocouple element comprising a pair of dissimilar thermocouple wires joined to form a thermocouple junction, an outer sheath surrounding each said wire and extending from a point adjacent said junction to a point exterior of said probe, and electrical insulating material interposed between each said wire and its outer sheath, and said structural core has lengthwise grooves formed therein for receiving said thermocouple sheath.

6. Apparatus as in claim 5 wherein, said structural core has a base portion for mounting of said probe, said probe further comprises, a single pin extending between opposite side walls of said shroud, and said structural core has a hole therethrough for receiving said pin, whereby said shroud is replaceable and thermal growth of said shroud is permitted.

7. Apparatus as in claim 6 wherein, the interior of said hollow structural core is formed by a plurality of overlapping longitudinal holes having a pair of plugs fitted into said holes at the ends of said core, the plug disposed in the base end of said core being elongated whereby the heat transmitted to said core is effectively dissipated through the base end of said core, said thermocouple sheath is joined to said grooves to prevent movement of said sheath relative to said structural core.

8. Apparatus as in claim 7 wherein said thermocouple sheath is joined to said grooves by means comprising, a pair of high resistance wires longitudinally disposed in said grooves against said sheath and the walls of said grooves, said wires being forcibly localized-resistance welded to said thermocouple sheath at the point of contact therebetween and to the walls at a plurality of locations along their length, whereby said thermocouple sheath is held in said groove and the heat transmitted to said thermocouple sheath is transmitted to said structural core.

9. A temperature sensing probe for insertion in a hot gas stream, said probe comprising, a structural member extending into said gas stream, said member having a groove formed therein, a temperature sensing element having an outer sheath disposed in said groove, a pair of wires having relatively high resistance longitudinally disposed in said groove against said sheath and the walls of said groove, said wires being forcibly localized-resistance welded to said sheath at the point of contact therebetween and to the walls of said groove at a plurality of locations along the length of said wires, whereby the temperature sensing element is held in said groove and restrained from movement relative to said member.

References Cited

UNITED STATES PATENTS

| | | | |
|---|---|---|---|
| 2,472,808 | 6/1949 | Dahl | 136—231 |
| 2,806,075 | 9/1957 | Gaubatz | 136—231 |
| 3,075,387 | 1/1963 | Rademacher | 136—230 X |
| 3,159,032 | 12/1964 | Rademacher et al. | 136—231 X |

ALLEN B. CURTIS, *Primary Examiner.*

M. J. ANDREWS, *Assistant Examiner.*